(12) United States Patent
Reed et al.

(10) Patent No.: US 10,258,193 B1
(45) Date of Patent: Apr. 16, 2019

(54) HAND SHIELD FOR COOKING UTENSILS

(71) Applicants: Ramona R. Reed, Monroeville, AL (US); Patrick S. Reed, Monroeville, AL (US)

(72) Inventors: Ramona R. Reed, Monroeville, AL (US); Patrick S. Reed, Monroeville, AL (US)

( * ) Notice: Subject to any disclaimer, the term of this patent is extended or adjusted under 35 U.S.C. 154(b) by 0 days.

(21) Appl. No.: 16/017,673

(22) Filed: Jun. 25, 2018

(51) Int. Cl.
*A47J 36/36* (2006.01)
*A47J 43/28* (2006.01)
*F23Q 2/34* (2006.01)

(52) U.S. Cl.
CPC ............. *A47J 36/36* (2013.01); *A47J 43/281* (2013.01); *A47J 43/288* (2013.01); *F23Q 2/34* (2013.01)

(58) Field of Classification Search
CPC ........ A47J 36/36; A47J 43/281; A47J 43/283; A47J 43/288; A47J 45/085; A47J 45/10
USPC ......................................... 294/9, 10, 11, 131
See application file for complete search history.

(56) References Cited

U.S. PATENT DOCUMENTS

| 116,739 | A | * | 7/1871 | Murphey | |
|---|---|---|---|---|---|
| 416,849 | A | * | 12/1889 | Neale | |
| 604,477 | A | * | 5/1898 | Moritz | |
| 32,918 | A | | 7/1900 | Ericson | |
| D32,918 | S | * | 7/1900 | Ericson | |
| 830,016 | A | | 9/1906 | Sims | |
| 1,096,204 | A | | 5/1914 | Taggart | |
| 1,835,719 | A | * | 12/1931 | Parr | A23G 9/50 426/134 |
| 2,047,580 | A | * | 7/1936 | Dewey | B67D 7/421 137/379 |
| 2,436,507 | A | | 2/1948 | Ellwood | |
| 3,858,320 | A | | 1/1975 | Neal et al. | |
| 5,099,527 | A | * | 3/1992 | Roose | E03C 1/308 294/131 |
| 6,125,493 | A | | 10/2000 | Daw | |
| 8,328,253 | B2 | | 12/2012 | Wales | |
| 2007/0187963 | A1 | | 8/2007 | Repp et al. | |

* cited by examiner

*Primary Examiner* — Dean J Kramer
(74) *Attorney, Agent, or Firm* — George L Williamson

(57) ABSTRACT

A heat shield in the shape of a semi-sphere made of flexible material and having a centralized opening therein so that the heat shield can be slidingly placed on the shaft or handle of a cooking utensil. The outer shell of the heat shield also has a plurality of criss-crossed ribs disposed thereon wherein the ribs are strengthening ribs for providing additional rigidity to the flexible shell which is expected to be made of a flexible, stretchable material like silicone or the like. The central opening in the shell is designed to have a plurality of slits radially extending therefrom so that the opening is useful for mounting on utensils having a variety of diameters because the opening is variable in diameter due to the slits and stretchability and flexibility of the material.

18 Claims, 2 Drawing Sheets

HAND SHIELD FOR COOKING UTENSILS

BACKGROUND OF THE INVENTION

Field of the Invention

The present invention relates generally to cooking utensils and, more particularly, is concerned with an apparatus for a hand shield for use with various cooking utensils.

Description of the Prior Art

Methods for hand shields for cooking utensils have been described in the prior art, however, none of the prior art devices disclose the unique features of the present invention. In U.S. Pat. No. 2,436,507 dated Feb. 24, 1948, Ellwood disclosed a hand shield for cooking utensils. In U.S. Pat. No. 6,125,493 dated Oct. 3, 2000, Daw disclosed a combination barbeque grill brush and mitt. In U.S. Pat. No. 3,858,320 dated Jan. 7, 1975, Neal, et al., disclosed a universal culinary tool with protective screen shield. In U.S. Pat. No. 830,016 dated Sep. 4, 1906, Sims disclosed a guard for kitchen utensils. In U.S. Pat. No. 1,096,204 dated May 12, 1914, Taggart disclosed a shield for cooking utensils. In U.S. Pat. No. 32,918 dated Jul. 10, 1900, Ericson disclosed a cake turner or similar article. In U.S. Pat. No. 8,328,253 dated Dec. 11, 2012, Wales disclosed a heat shield for grilling tools. In U.S. Patent Application Publication 2007/0187963 dated Aug. 16, 2007, Repp, et al., disclosed a combination grill bit and grill tool.

While these methods for hand shields for cooking utensils may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a heat shield in the shape of a semi-sphere made of flexible material and having a centralized opening therein so that the heat shield can be slidingly placed on the shaft or handle of a cooking utensil. The outer shell of the heat shield also has a plurality of criss-crossed ribs disposed thereon wherein the ribs are strengthening ribs for providing additional rigidity to the flexible shell which is expected to be made of a flexible, stretchable heat resistant material like silicone or the like. The central opening in the shell of the present invention is designed to have a plurality of slits radially extending therefrom so that the opening is useful for mounting on utensils having a variety of diameters because the opening is variable in diameter due to the slits and stretchability and flexibility of the material.

An object of the present invention is to reduce the risk of burn to a users hand from steam and/or splatter from hot grease or sauces. A further object of the present invention is to reduce the risk of burn to the hand which can occur when a users hand brushes a pot rim and/or a cooking or grilling surface. A further object of the present invention is to prevent the user from singeing the hair off their knuckles and hand. A further object of the present invention is to deflect extreme heat from the hand of user while cooking or roasting over a stove top, open fire or grill. A further object of the present invention is to reduce risk of a flash burn when operating a utility lighter or lighter stick to ignite a grill, fireplace, stove top, outdoor gas burner, gas heater or camp fire. A further object of the present invention is to provide a shield which can be efficiently and conveniently disposed on a variety of various sized cooking utensils and which may be interchangeably used with various sized and shaped cooking utensils and/or lighting sticks. A further object of the present invention is to provide a heat shield which can be relatively easily used by an operator. A further object of the present invention is to provide a heat shield which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
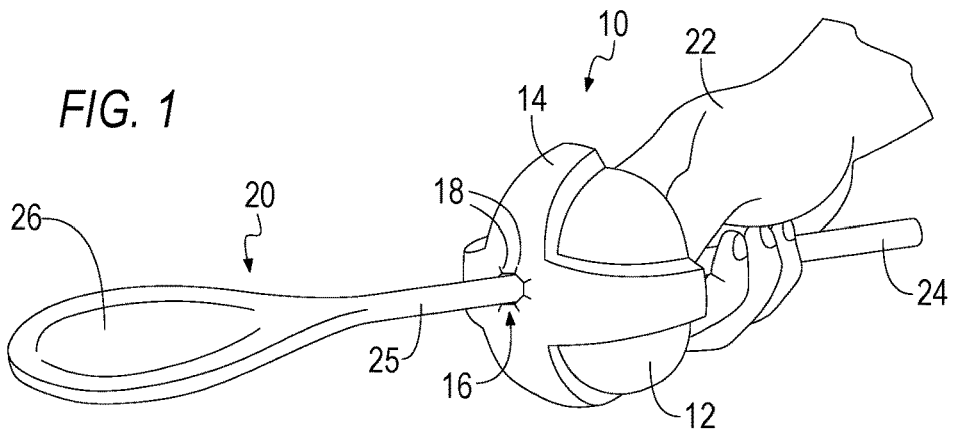
FIG. 1 is a front perspective view of the present invention shown in operative connection with a spoon.

With regard to reference numerals used, the following numbering is used throughout the drawings.

10 present invention
12 shell
14 ribs
16 opening
18 slits
20 cooking utensil
22 hand of user
24 handle portion
25 shaft portion 26 spoon
28 stick
29 pointed tip
30 spatula
32 wall of rib
34 concave area
36 flap portion
38 front surface
40 rear surface
42 rim
44 utility lighter
46 flame

DETAILED DESCRIPTION OF THE
PREFERRED EMBODIMENT(S)

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 11 illustrates the present invention wherein a flexible shield for a cooking utensil is disclosed and which is generally indicated by reference numeral 10.

Figure 5:
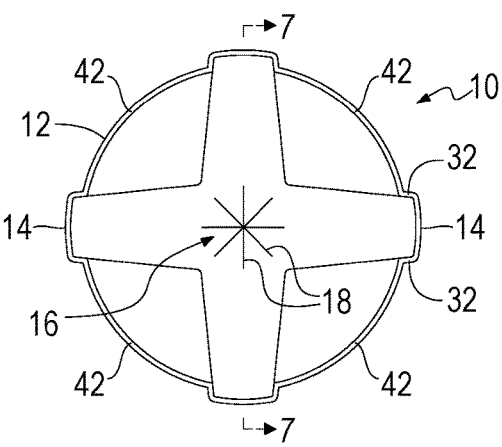
FIG. 5 is a rear elevation view of the present invention.
Figure 6:
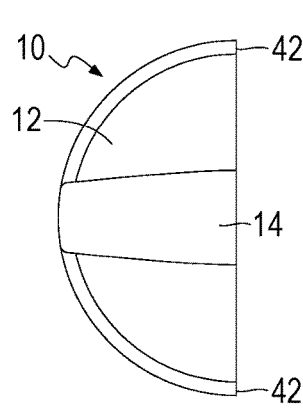
FIG. 6 is a side elevation view of the present invention.
Figure 7:
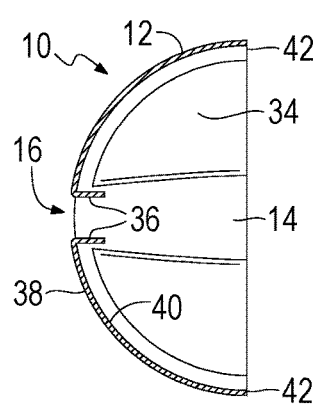
FIG. 7 is a cross sectional view of the present invention taken from FIG. 5 as indicated.

Turning to FIGS. 1 through 11, shown therein is the present invention 10 having a shell 12 which is shaped as a semi-sphere or half of a sphere which may be referred to as a hemisphere or hemispherical in this specification. The shell portion 12 has a plurality of criss-crossed raised reinforcement ribs 14 thereon wherein the ribs are used to strengthen the shell so as to keep it from easily collapsing inwardly toward its center portion. Also shown is an opening 16 which is centrally disposed in the shell 12 having a plurality of radially extending slits 18 therein which slits are useful for allowing the opening 16 to be easily varied in size as to fit on various sizes of cooking utensils and prevents the shell from tearing as the opening flexes and stretches. Also shown is a cooking utensil 20 along with a hand 22 of a user grasping a handle portion 24 of a spoon 26, a stick 28 and a spatula 30 indicating that the present invention 10 can be used with a variety of kinds of differently sized and shaped cooking utensils which may be employed in indoor or outdoor cooking environments, such as stoves, grills, or open fires. The cooking utensil 20 has a handle portion 24, a distal end or functional end portion comprising, e.g., a spoon 26, a pointed tip 29, or a spatula 30, and a shaft portion 25 generally disposed between the handle portion and the distal end portion. The present invention 10 is expected to normally be disposed on the shaft portion 25 between the handle portion 24 and the distal end. The present invention 10 is sized so as to protect the hand 22 of the user having an inner concave area 34 as best shown in FIG. 7 wherein the inner concave area 34 can partially receive and accommodate the hand 22 of a user being placed therein. The ribs 14 are expected to be disposed in an outward orientation as shown in FIG. 5 wherein there are a total of four ribs, each rib having a pair of oppositely disposed walls 32 which are outwardly disposed away from the center opening 16 and which are intended to strengthen the shell 12 of the present invention 10. Rim 42 is shown at the termination of the edge of the shell 12 in FIGS. 5-7.

Figure 2:
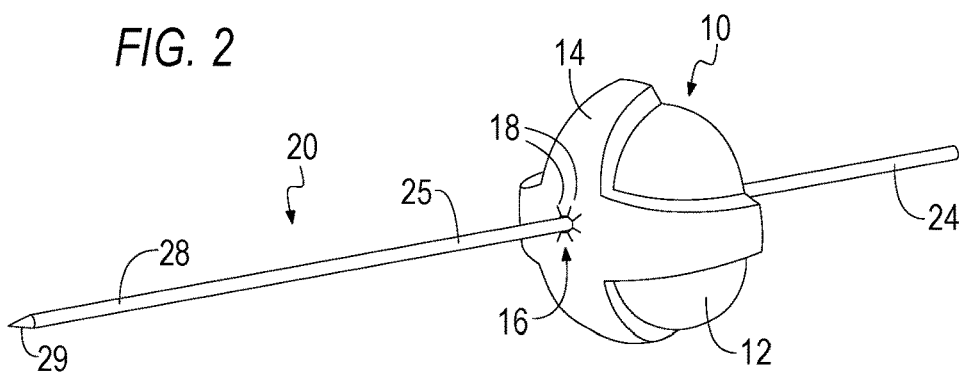
FIG. 2 is a front perspective view of the present invention shown in operative connection with a stick.
Figure 3:
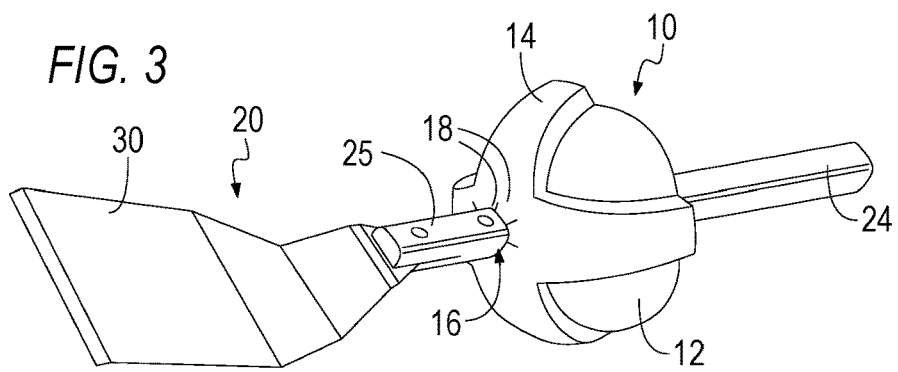
FIG. 3 is a front perspective view of the present invention shown in operative connection with a spatula.

FIGS. 1-3 illustrate a hand 22 of a user grasping the handle portion 24 of a spoon 26, a stick 28 and a spatula 30 wherein the spoon is useful for stirring food over an open fire or a conventional indoor stove, the stick is useful for roasting marshmallows or the like over an open fire, and the spatula is useful for flipping hamburger patties or the like over a conventional indoor stove or an outdoor grill.

FIG. 7 shows the present invention 10 with its opening 16 wherein the slits 18 are pushed inwardly as would occur when a cooking utensil was inserted through the opening 16 of the present invention 10 wherein the slits form flap-like segments 36 which conform to, make contact with, and seal around the outer circumference of the cooking utensils 20 as shown in FIGS. 1-3 to prevent heat from passing through the opening toward the hand 22 of the user.

Figure 8:
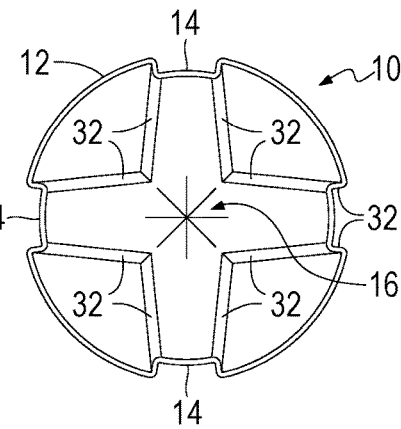
FIG. 8 is a rear elevation view of the present invention showing the ribs disposed on the inside thereof.

FIG. 8 shows an alternative embodiment of the present invention 10 wherein the ribs 14 are inwardly disposed toward the center of the present invention so that the walls 32 of the ribs are disposed so that they are disposed toward the center opening 16 of the present invention 10.

Figure 9:
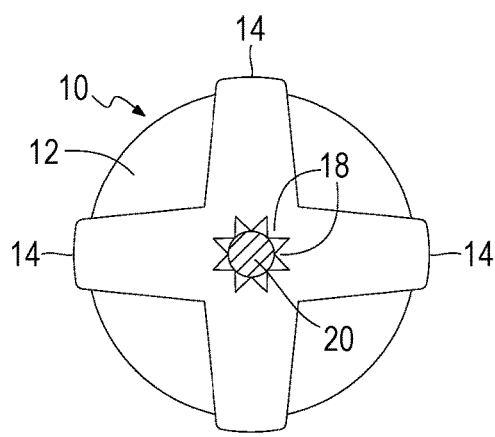
FIG. 9 is a front view of the present invention for use with a spoon similar to that as shown in Figure with certain parts shown in cross-section for ease of illustration.

FIG. 9 shows the present invention 10 in association with a cooking utensil 20 which is round in shape as would occur in FIG. 1 or FIG. 2 wherein the slits 18 are shown disposed around the outer circumference of the cooking utensil 20.

Figure 10:
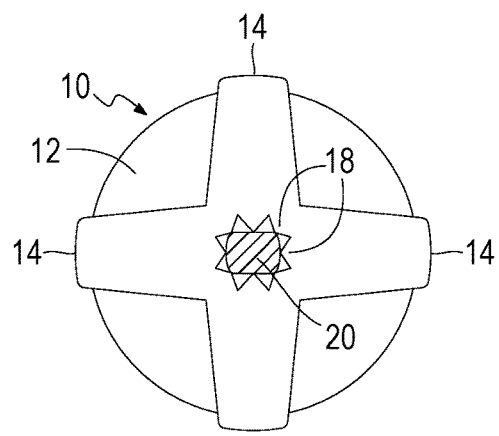
FIG. 10 is a front view of the present invention for use with a spatula similar to that as shown in FIG. 3 with certain parts shown in cross-section for ease of illustration.

FIG. 10 is a view similar to FIG. 9 except that the cooking utensil 20 is somewhat square shaped as would occur similar to that shown in FIG. 3.

Figure 11:
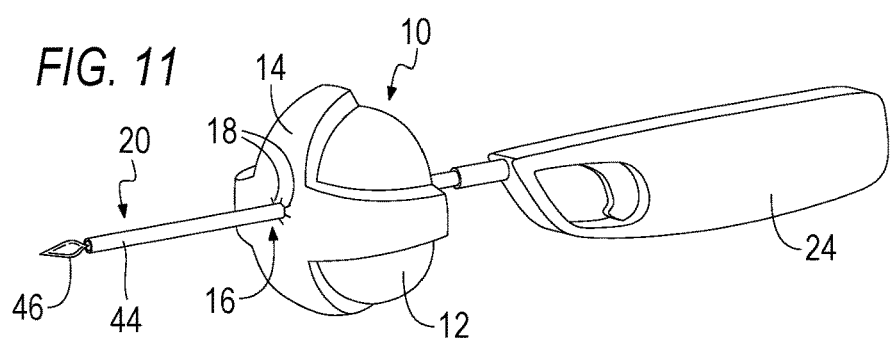
FIG. 11 is a front perspective view of the present invention shown in operative connection with a utility lighter.
Figure 4:
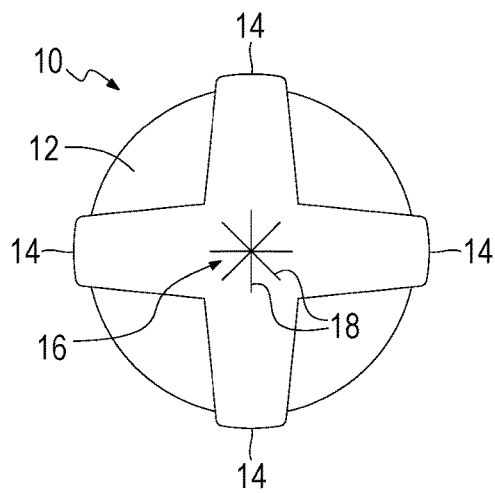
FIG. 4 is a front elevation view of the present invention.

FIG. 11 illustrates the present invention 10 mounted on the barrel of a conventional utility lighter 44, which may be referred to a lighter stick or a similar name, also showing flame 46 coming from its tip and which is useful for lighting the burners of a conventional outdoor gas grill, or for use with a charcoal grill, or lighting a fire of an open outdoor fire. A utility lighter 44 is commonly commercially available being frequently fueled by butane. Previously disclosed elements may also be shown.

By way of summary and with reference to FIGS. 1-11, the opening 16 is substantially centrally located and extends entirely through the shell 12 from the front surface 38 to the rear surface 40 of the shell. FIGS. 1-3 show the utensil 20 protruding from the front side 38 of the shell 12. The concave area 34 forms a recessed area in which the hand 22 of a user can be partially placed. Walls 32 are somewhat perpendicular to an imaginary center line passing through the center of opening 16 from the front surface 38 to the rear surface 40 being generally parallel with a longitudinal center line of a cooking utensil 20 in operative connection with the present invention 10 as shown in FIG. 1-3.

The present invention 10 can be manufactured so that its diameter can be made in a variety of sizes so to accommodate various sizes of utensils 20 and/or hands 22. It is expected that the present invention 10 will be made of silicone or the like so as to be heat resistant, flexible and stretchable so as to be easily slidably placed on various sizes of cooking utensils.

We claim:

1. A hand shield for mounting on a cooking utensil, the cooking utensil having a shaft portion disposed between a handle portion and a distal end, the cooking utensil for being held in a hand of a user, comprising:

a) a semi-spherical shell for being slidably mounted on the shaft portion of the cooking utensil;

b) said shell having a centrally disposed opening and a recessed area therein, wherein the shaft portion of the cooking utensil protrudes through said opening and the hand of the user is partially enclosed in said recessed area;

c) a plurality of ribs formed in said shell for strengthening said shell, wherein said ribs extend from said opening to a rim of said shell, each rib having a pair of oppositely disposed walls; and d) wherein said opening is variable in size so as to fit on various sizes and shapes of cooking utensils.

2. The hand shield of claim 1, wherein said oppositely disposed walls are outwardly disposed.

3. The hand shield of claim 1, further comprising a plurality of radially extending slits disposed in said opening for sealingly contacting the cooking utensil.

4. The hand shield of claim 1, wherein said oppositely disposed walls are inwardly disposed.

5. A method for making a hand shield for mounting on a cooking utensil, the cooking utensil having a shaft portion disposed between a handle portion and a distal end, the cooking utensil for being held in the hand of a user, comprising the steps of:
 a) providing a semi-spherical shell for being slidably mounted on the shaft portion of the cooking utensil;
 b) providing a centrally disposed opening and a recessed area in the shell, wherein the cooking utensil protrudes through the opening and the hand of the user is partially enclosed in the recessed area;
 c) strengthening the shell by forming a plurality of ribs therein, wherein the ribs extend from the opening to a rim of the shell, each rib having a pair of oppositely disposed walls; and
 d) wherein the opening is variable in size so as to fit on various sizes and shapes of cooking utensils.

6. The method of claim 5, wherein the oppositely disposed walls are outwardly disposed.

7. The method of claim 5, further comprising the step of providing a plurality of radially extending slits in the opening for sealingly contacting the cooking utensil.

8. The method of claim 5, wherein said oppositely disposed walls are inwardly disposed.

9. A hand shield for mounting on a cooking utensil, the cooking utensil having a shaft portion disposed between a handle portion and a distal end, the cooking utensil for being held in a hand of a user, comprising:
 a) a semi-spherical shell for being slidably mounted on the shaft portion of the cooking utensil;
 b) said shell having a centrally disposed opening and a recessed area therein, wherein the shaft portion of the cooking utensil protrudes through said opening and the hand of the user is partially enclosed in said recessed area, said opening extending entirely through said shell from a front surface to a rear surface of said shell;
 c) a plurality of criss-crossed ribs disposed in said shell for strengthening said shell, wherein said ribs extend from a center of said opening to a rim of said shell;
 d) wherein said opening is variable in size so as to fit on various sizes and shapes of cooking utensils;
 e) a plurality of radially extending slits disposed in said opening for sealingly contacting the cooking utensil; and
 f) wherein the cooking utensil is selected from the group consisting of a spoon, a stick, a utility lighter, and a spatula.

10. The hand shield of claim 9, wherein said ribs are four in number.

11. The hand shield of claim 10, wherein said shell is made of flexible material.

12. The hand shield of claim 11, wherein said shell is made of stretchable material.

13. The hand shield of claim 12, wherein said shell is made of silicone.

14. A method for making a hand shield for mounting on a cooking utensil, the conking utensil having a shaft portion disposed between a handle portion and a distal end, the cooking utensil for being held in the hand of a user, comprising the steps of:
 a) providing a semi-spherical shell for being slidably mounted on the shaft portion of the cooking utensil;
 b) providing a centrally disposed opening and a recessed area in the shell, wherein the cooking utensil protrudes through the opening and the hand of the user is partially enclosed in the recessed area, wherein the opening extends entirely through the shell from a front surface to a rear surface of the shell;
 c) strengthening the shell by providing a plurality of criss-crossed ribs therein, wherein the ribs extend from a center of the opening to a rim of the shell;
 d) wherein the opening is variable in size so as to fit on various sizes and shapes of cooking utensils;
 e) providing a plurality of radially extending slits in the opening for sealingly contacting the cooking utensil; and
 f) selecting the cooking utensil the group consisting of a spoon, a stick, a utility lighter, and a spatula.

15. The method of claim 14, wherein the ribs are four in number.

16. The method of claim 15, wherein the shell is made of flexible material.

17. The method of claim 16, wherein the shell is made of stretchable material.

18. The method of claim 17, wherein the shell is made of silicone.

\* \* \* \* \*